(12) United States Patent
Schurig et al.

(10) Patent No.: US 6,805,818 B2
(45) Date of Patent: *Oct. 19, 2004

(54) APPARATUS AND METHODS FOR FORMING PATTERNED SOFT GELATIN CAPSULES

(75) Inventors: Gregory A. Schurig, Clearwater, FL (US); Bud Bezaire, Kingsville (CA); Michael Ratko, Windsor (CA); Lawrence A. Baker, Tampa, FL (US); Robert Mikalian, Windsor (CA)

(73) Assignee: Pursuit Marketing, Inc., Des Plaines, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/373,158

(22) Filed: Feb. 24, 2003

(65) Prior Publication Data

US 2003/0127760 A1 Jul. 10, 2003

(Under 37 CFR 1.47)

Related U.S. Application Data

(62) Division of application No. 09/399,308, filed on Sep. 20, 1999, now Pat. No. 6,569,363, which is a continuation of application No. 08/937,693, filed on Sep. 29, 1997, now Pat. No. 6,022,499, which is a continuation of application No. 07/927,604, filed on Aug. 10, 1992, now Pat. No. 5,672,300.

(51) Int. Cl.[7] .......................... B29C 39/12; B29C 47/04
(52) U.S. Cl. ..................... 264/4; 264/75; 264/DIG. 37; 425/5; 425/133.5; 425/375; 425/804
(58) Field of Search ........................ 264/4, 75, DIG. 37, 264/73, 71; 425/5, 804, 131.1, 133.5, 375; 53/900

(56) References Cited

U.S. PATENT DOCUMENTS

| | | | | |
|---|---|---|---|---|
| 5,246,635 | A | * | 9/1993 | Ratko et al. |
| 5,672,300 | A | * | 9/1997 | Schurig et al. |
| 6,022,499 | A | * | 2/2000 | Schurig et al. |
| 6,569,363 | B1 | * | 5/2003 | Schurig et al. |
| 2002/0153626 | A1 | * | 10/2002 | Manotas |

* cited by examiner

Primary Examiner—Duane S. Smith
(74) Attorney, Agent, or Firm—Neal, Gerber and Eisenberg LLP

(57) ABSTRACT

An apparatus and a process useful for producing patterned gelatin ribbons for forming patterned soft gelatin capsules are disclosed. The apparatus and process use multiple spreader boxes to form a wide variety of possible patterns.

16 Claims, 5 Drawing Sheets

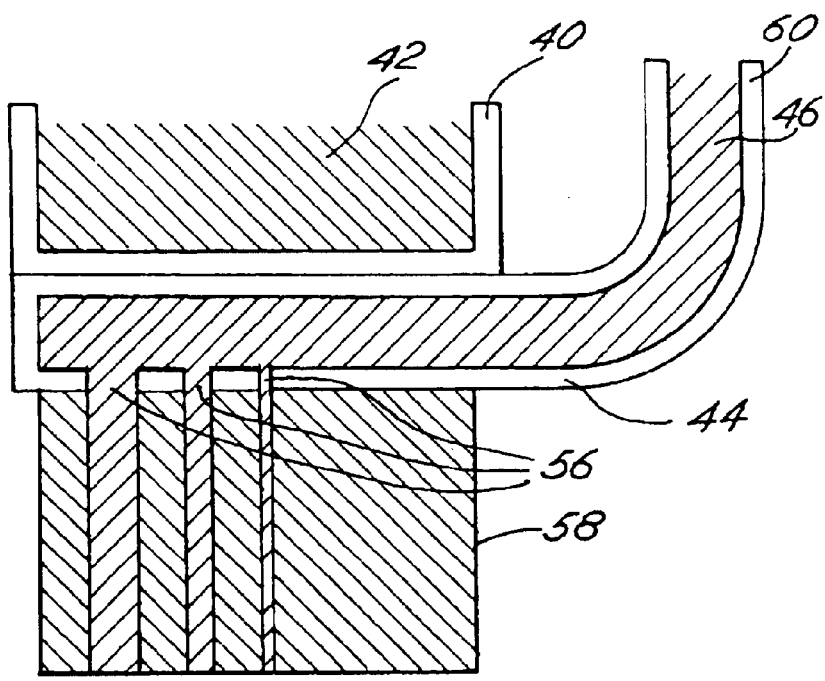
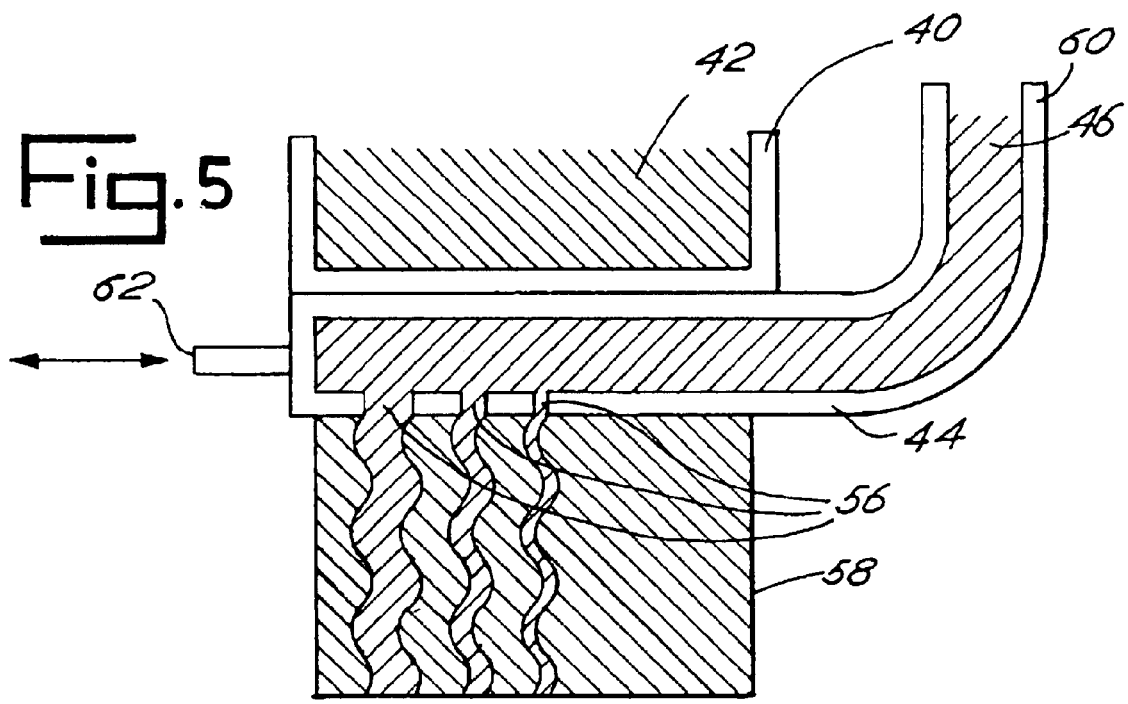

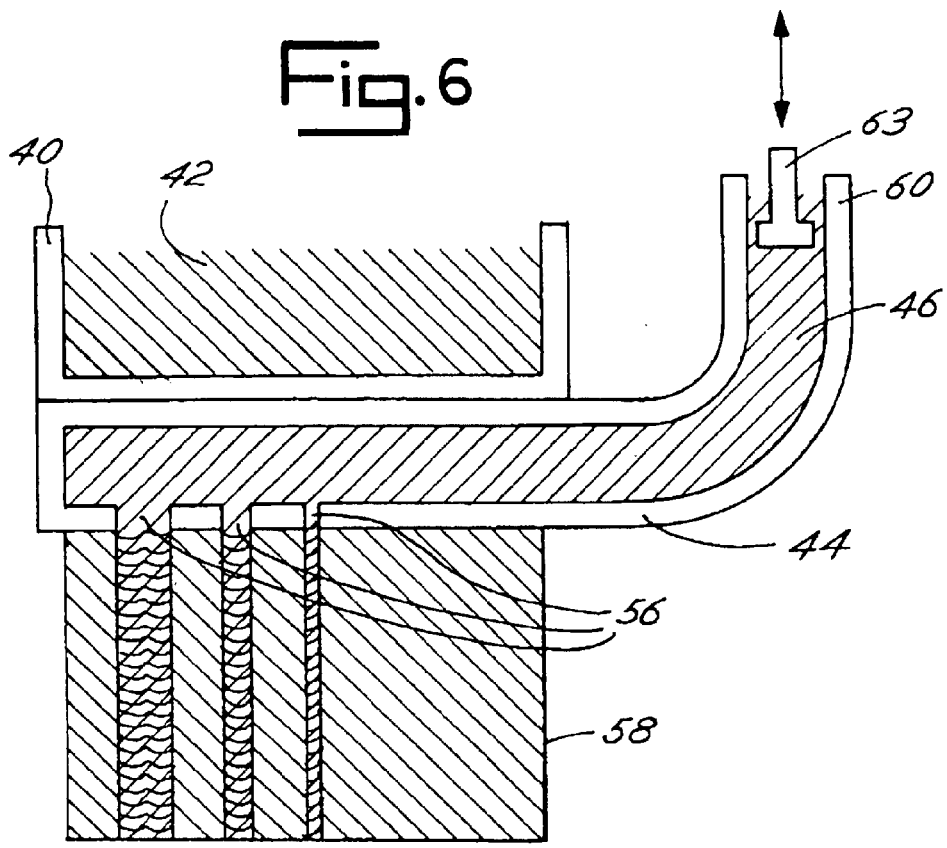
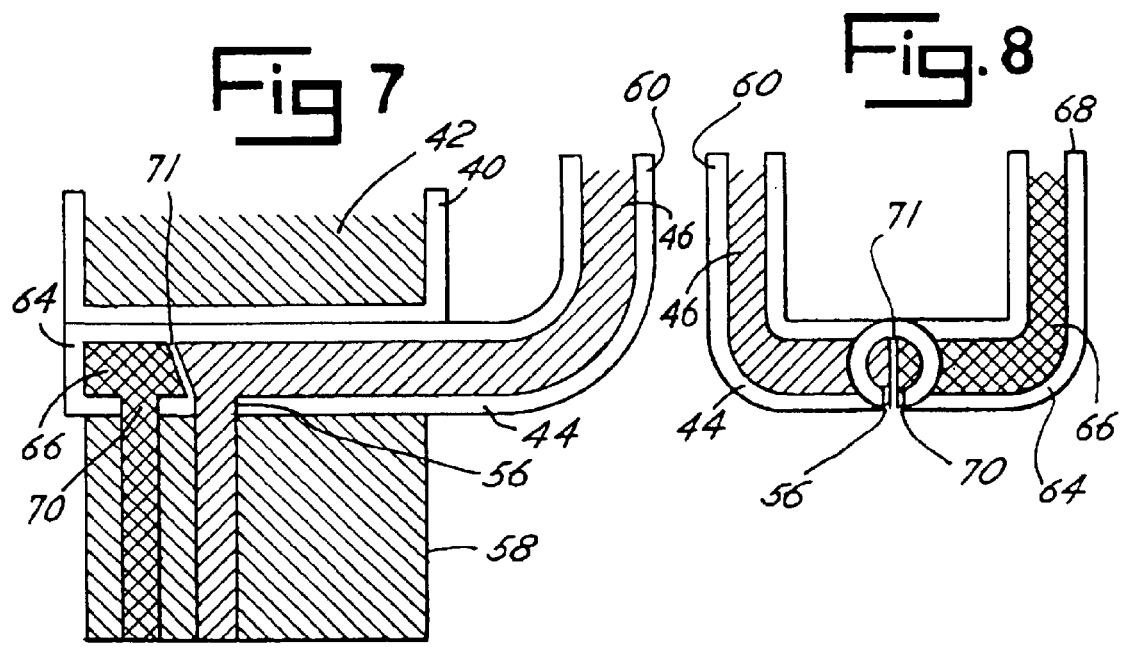

APPARATUS AND METHODS FOR FORMING PATTERNED SOFT GELATIN CAPSULES

RELATED APPLICATIONS

This application is a divisional of U.S. patent application Ser. No. 09/399,308 filed Sep. 20, 1999 which is now U.S. Pat. No. 6,569,363 issued on May 27, 2003; which is a continuation of U.S. patent application Ser. No. 08/937,693 filed Sep. 29, 1997, now U.S. Pat. No. 6,022,499, which is a continuation of U.S. patent application Ser. No. 07/927,604 filed Aug. 10, 1992, now U.S. Pat. No. 5,672,300.

BACKGROUND OF THE INVENTION

1. Field of the Invention

The present invention relates to apparatus and methods for producing patterned soft gelatin capsules.

2. Background of the Art

Capsules are solid dosage forms in which therapeutic agents are enclosed in a soluble gelatin wall. The wall can be made of either soft or hard gelatin. Soft gelatin capsules ("SGC" or soft gels) comprise a soft, globular, gelatin wall. The gelatin may be plasticized by the addition of additives such as glycerin, sorbitol, or a similar types of polyols. Soft gelatin capsules offer a convenient dosage form for the administration of drugs, nutrients, vitamins, foodstuff and cosmetics.

Commercially available SGCs come in a wide choice of sizes and shapes, e.g., they may be round, oval, oblong, tubular or suppository-shaped. These SGCs are formed by joining two identical halves to form a shell encapsulating a fill.

Upon ingestion by the consumer (or on contact with water), moisture causes the capsule to come apart at the seams where the two halves are joined thereby releasing the fill or contents of the capsule.

SGCs are generally prepared by one of two methods. The first method is known as the plate process. In this method, a set of molds is used. A warm sheet of gelatin is laid over a lower plate and the liquid fill is poured on it. A second sheet of gelatin is then placed on top followed by the top plate. The set is placed under pressure to form the desired capsule. The sheets of gelatin used to form the capsule may be colored or uncolored.

In 1933, Robert P. Scherer invented the rotary-die process. In this process, soft gelatin capsules are made by continuously casting two separate ribbons of molten or flowable gelatin into two separate rotating dies of an encapsulation machine to produce soft, elastic gelatin capsules. Dyes or other suitable coloring material can be added to the molten gelatin to produce soft gelatin capsules of various colors. In addition, if different dyes are added to the different molten gelatin masses then softgels with halves of different colors can be made. A more detailed description of the well known soft gelatin capsule art may be found in Ebert, "Soft Elastic Gelatin Capsules: A Unique Dosage Form," *Pharmaceutical Technology*, October 1977 and in "The Theory and Practice of Industrial Pharmacy", Chapter 13, Lachman et al., published by Lea and Febiger, 1970. The rotary die process described in these references are incorporated herein by reference as being descriptive of the rotary die process to which the present invention is related.

The art also teaches applying identifying marks to the exterior surface of the capsule shell. Specific examples of known processes and machines used for applying some type of identification on softgels are shown, for example, in U.S. Pat. No. 2,449,139; Scherer U.S. Pat. No. 2,623,494; Scherer U.S. Pat. No. 2,688,775; Taylor U.S. Pat. No. 3,124,840; Hansen U.S. Pat. No. 3,203,347; and Vincent U.S. Pat. No. 3,333,031.

Scherer U.S. Pat. No. 2,623,494 relates to a banding machine for softgels. In this machine, the identifying band is applied to each individual capsule after the capsule is formed.

Scherer U.S. Pat. No. 2,688,775 shows a method for applying a brand to the exterior surface of a gelatin capsule.

Scherer U.S. Pat. No. 2,703,047 discloses a similar system of branding the filled capsules.

In Taylor U.S. Pat. No. 3,124,840, a printing element is provided in order to print on the gelatin strip prior to the formation of the capsule.

Hansen U.S. Pat. No. 3,203,347 shows a marking fluid that is printed on the gelatin ribbon used to make the softgels.

Vincent U.S. Pat. No. 3,333,031 shows dyeing of the gelatin strip before formation.

Scherer U.S. Pat. No. 2,596,176 teaches a method as well as an apparatus for striping gelatin capsules. In this method, gelatin capsule is grasped at its ends, successive contiguous parts of the capsule are abraded and, as the parts are being abraded, colors are applied.

German Patent No. 3,818,071 discloses processes for printing on the gelatin ribbons or strips used to manufacture soft gelatin capsules.

In the early 1960's, R. P. Scherer in Canada produced and sold soft gelatin capsules made by the so-called "swirl" method. In the swirl method, two different colors of molten gelatin were fed into a single spreader box. The two different colors of gelatin were then allowed to intermingle or swirl and then to simultaneously flow through the opening at the bottom of the spreader box to form a patterned gelatin ribbon. However, because only a single spreader box was used, the exact nature of the pattern was difficult to control. Applicant has been unable to determine whether capsules made by the "swirl" method were ever commercialized within the United States.

The prior apparatus and methods for making soft gelatin capsules have failed to provide a convenient, easy to use, reproducible apparatus and method for producing patterned soft gelatin capsules, such as striped capsules. The prior methods have been unsatisfactory, such as those that merely printed patterns on the exterior surface of the gelatin ribbon, laborious, such as the abrasion method disclosed in Scherer U.S. Pat. No. 2,596,176, or lack reproducibility. There is a need in the art for an apparatus and method to solve these problems.

SUMMARY OF THE INVENTION

It is an object of the present invention to provide a convenient, easy to use apparatus useful for forming patterned soft gelatin capsules in a reproducible manner. It is also an object of the present invention to provide a process for making such patterned soft gelatin capsules that achieves the same benefits.

It is a specific object of the present invention to provide an apparatus for producing a patterned gelatin ribbon that is in turn useful for forming patterned soft gelatin capsules. The inventive apparatus includes a first spreader box for holding a first flowable gelatin mass. A second spreader box is then provided to hold a second flowable gelatin mass. The first type of gelatin and the second type of gelatin are visually distinct, preferably by being different colors, such that the visual distinction between the two gelatins will form the pattern on the gelatin ribbon.

The second spreader box is positioned within the first spreader box. In this manner, an outer surface of the second spreader box and an inner surface of the first spreader box define a gap or opening through which the first gelatin may flow to form a base gelatin ribbon. The second spreader box has at least one opening through which the second gelatin flows onto a portion of the base gelatin ribbon. Since both gelatin types tend to preferably be molten or flowable at this point, they tend to meld together to form a patterned gelatin ribbon, which in turn may be used to form patterned soft gelatin capsules.

It is another specific object of the present invention to provide a process for producing a patterned gelatin ribbon that is useful for forming patterned soft gelatin capsules. In this process, a first gelatin mass contained in a first spreader box is flowed through a gap formed by an inner surface of the first spreader box and an outer surface of a second spreader box, the second spreader box being positioned within the first spreader box. When the first gelatin mass flows through this gap, it forms a base gelatin ribbon. The second gelatin mass, which is contained in the second spreader box, flows through an opening in the second spreader box onto a portion of the base gelatin ribbon, thereby forming a patterned gelatin ribbon. As with the inventive apparatus, the two types of gelatin are visually distinct from each other.

Other objects and embodiments of the present invention will be discussed below. However, it is important to note that many additional embodiments of the present invention not described in this specification may nevertheless fall within the spirit and scope of the present invention and/or the claims.

BRIEF DESCRIPTION OF THE DRAWINGS

FIG. 4 is a plan cross-sectional, schematic view of the apparatus of FIG. 3;

FIG. 5 is a plan cross-sectional, schematic view of another preferred embodiment of the inventive apparatus;

FIG. 6 is a plan cross-sectional, schematic view of another preferred embodiment of the inventive apparatus;

FIG. 7 is a plan cross-sectional, schematic view of another preferred embodiment of the inventive apparatus in which a third spreader box is included;

FIG. 8 is a side cross-sectional, schematic view of the second and third spreader boxes of the inventive apparatus of FIG. 7;

DETAILED DESCRIPTION OF THE PREFERRED EMBODIMENTS

Figure 1:
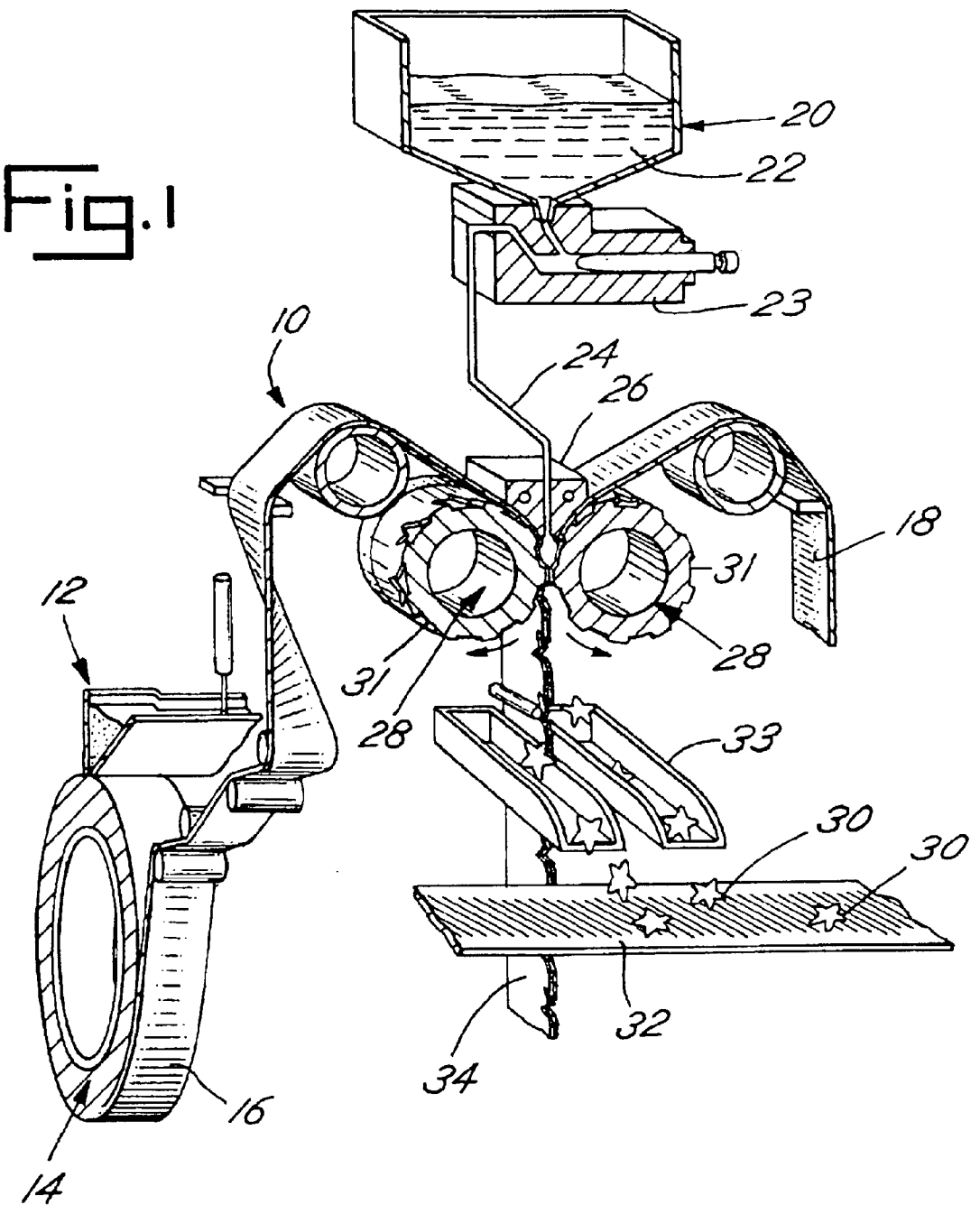
FIG. 1 is a schematic drawing showing the basic components of the conventional rotary die process for making soft gelatin capsules.

The prior art rotary die process machine, generally 10, is schematically illustrated in FIG. 1. The principal parts thereof include a gelatin metering device or spreader box, generally 12, in which a gelatin ribbon 16 is formed. For convenience in illustration, only one spreader box 12 and one rotary drum 14 are illustrated in FIG. 1. Since the rotary die process forms two distinct gelatin ribbon streams, the second being designated as 18, it is to be understood that a similarly situated spreader box (not shown in FIG. 1) and rotary drum (not shown in FIG. 1) are utilized in connection with the formation of the gelatin ribbon 18.

If desired, the rotary die process machine 10 may further include a tank 20, generally containing a liquid fill material that is any of a wide variety of substances both of an edible nature, such as vitamins and pharmaceuticals, or of an inedible nature, including oils, bath soaps, and the like. The fill material 22 contained in the tank 20 flows to a fill pump 23 that meters the volume of the fill material that passes through a line 24 to an injection wedge 26. The narrowed lower end of the wedge 26 is constructed and shaped to be located between a pair of rotary dies, generally 28, which contain matching die pockets 31. The rotary dies 28 rotate in the direction designated by the arrows 29 shown in FIG. 1. The fill material 22 passes through the filling wedge 26 into the space formed in the gelatin by the die pockets 31 formed by and between the rotary dies 28 where the softgels 30 are filled, shaped, hermetically sealed and cut from the gel ribbons 16, 18 using conventional techniques. The filled capsules or softgels 30 that are formed are dropped into collecting chutes 33 where they fall down onto conveyor 32. The gelatin net 34 that remains after the capsules 30 are cut is then passed on for collecting and reuse in a known manner.

Figure 2:
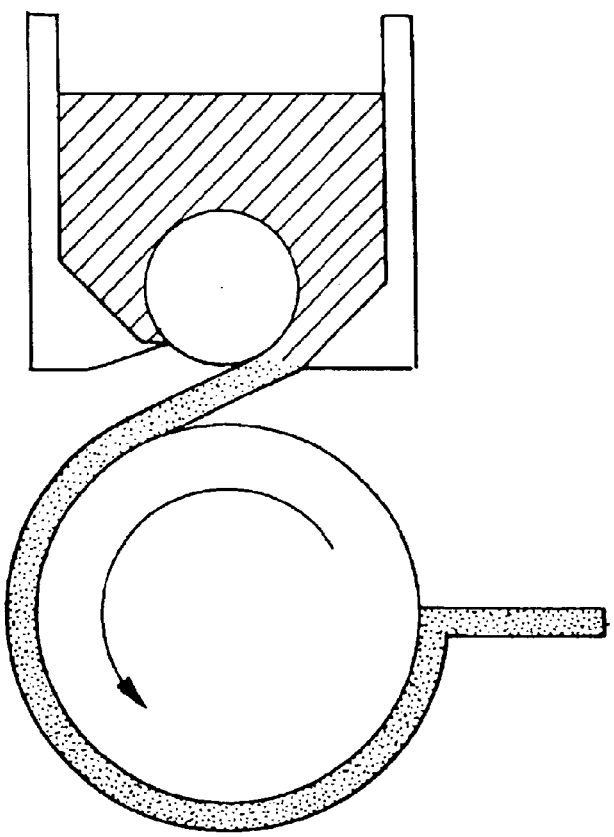
FIG. 2 is a side cross-sectional, schematic view of a conventional spreader box and its relationship to the rotating casting drum.

Referring to FIG. 2, the spreader box 12 used in the prior art rotary die process is shown in greater detail. The spreader box 12 contains the molten gelatin 35. The gap between the solid rotating rod 36 and the slot 39 at the bottom of the spreader box controls the amount of gelatin that flows onto the rotating cast drum 14. As the gelatin ribbon 37 is carried away by the rotating casting drum, it solidifies and sets up. The gelatin ribbon 37 is then stripped off the rotating casting drum at location 38. The gelatin ribbon 37 then proceeds to the encapsulation machine to be made into softgels as shown in FIG. 1. There is one spreader box/rotating casting drum assembly required for each of the two gelatin ribbons needed to make soft gelatin capsules.

Figure 3:
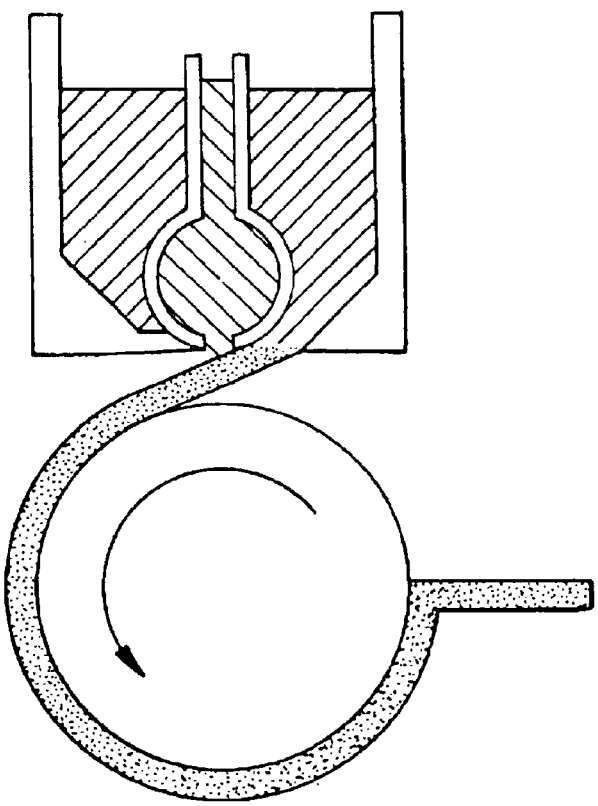
FIG. 3 is a side cross-sectional, schematic view of a preferred embodiment of the inventive apparatus.

Referring now to FIG. 3, a preferred embodiment of the present invention includes a first spreader box 40. Contained within the first spreader box 40 is the first flowable gelatin mass 42. Also positioned within the first spreader box 40 is the second spreader box 44. In this particular embodiment the second spreader box is a hollow cylindrical tube, though many other shapes and conformations may be used in the present invention. Contained within the second spreader box 44 is a second flowable gelatin mass 46. The second gelatin 46 is visually distinct from the first gelatin 42. In many preferred embodiments, this will mean that the two type of gelatin have different colors, though different levels of gloss or the presence or absence of reflective particles or other differences may impart visual distinctiveness of the two types of gelatin.

The outer surface 48 of the second spreader box 44 and the inner surface 50 of the first spreader box 40 form a gap 52 through which the first gelatin mass 42 may flow. As it flows through gap 52, the first gelatin mass forms the base gelatin ribbon 54.

The second spreader box 44 is provided with at least one opening 56 through which the second gelatin mass 46 may flow onto the base gelatin ribbon 54. Since the base gelatin ribbon 54 and the second gelatin 46 are both molten and/or flowable, they will tend to meld together to form a patterned gelatin ribbon 58. The patterned gelatin ribbon 58 is then cast onto a rotating casting drum 4 in a conventional manner. The patterned gelatin ribbon 58 may then be used in a conventional manner in the rotary die process to make soft gelatin capsules. The resulting capsules will carry the pattern of the patterned ribbon gelatin ribbon 58 on at least the half capsule that the patterned gelatin ribbon 58 is used to form.

In practice, the opening 56 may permit the second gelatin mass 46 to flow onto the base ribbon 54 simultaneous with the formation of the base ribbon 54, immediately prior to the formation of the base ribbon 54 or immediately after the formation of the base ribbon 54. In practice, greater control and reproducibility of the pattern on the resulting patterned gelatin ribbon 58 is obtained if the second gelatin mass 46 is applied to the base ribbon 54 immediately after formation of the base ribbon to 54. However, it may be desirable in order to achieve certain visual effects to have the second gelatin 46 flow onto a portion of the base ribbon 54 before the base ribbon 54 is fully formed or simultaneous with the formation of the base ribbon 54.

Referring now to FIG. 4, the second spreader box 44 is shown in different detail. The second spreader box 44 includes a feed tube 60 that permits filling of the second spreader box 44 with the second gelatin 46. In FIG. 4, the second spreader box 44 has a plurality of openings (three) 56 of varying widths. Thus, the resulting patterned gelatin ribbon 58 will have three stripes of different width. Of course, depending on the size and relative position of the openings 56 in the second spreader box 44, a wide variety of striping designs can be obtained through use of the present invention.

Referring now to FIG. 5, another preferred embodiment of the present invention is shown. In this embodiment, the hollow tube second spreader box 44 is movable with respect to the first spreader box 40. The second spreader box 44 is operatively connected to a mover 62. In a most preferred form, the mover 62 oscillator that causes the hollow tube spreader box 44 to oscillate relative to the fixed first spreader box 40. A wide variety of movers 62 may be used in connection with the present invention, such as gear motors, air motors and vibrators. In a most preferred form, the mover 62 is a variable speed gear motor.

The apparatus of FIG. 5 may be used to form patterned gelatin ribbons 58 having wavy stripes of various widths and positions. One of only many possible variations of wavy striping is shown in FIG. 5.

Referring now to FIG. 6, another preferred embodiment of the present invention is shown. In this embodiment, the feed tube to the second spreader box 44 is operatively attached to a pressurizer 63. A preferred type of pressurizer 63 is a plunger adapted to fit in the feed tube 60 to alternately pressurize and depressurize the second gelatin mass 46 within the second spreader box 44.

The pressurizer 63 allows the flow rate of the second gelatin mass 46 through the openings 56 in the second spreader box 44 to be varied and controlled. The use of an oscillating plunger as the pressurizer 63 will cause a ridging effect in the stripes formed by the second gelatin mass 46 on the base gelatin ribbon 54. This results in a patterned gelatin 58 having ridged stripes. Of course, an oscillating mover 62 of the type shown in FIG. 5 may be combined with a pressurizer 63 to form ridged, wavy stripes and various other patterns.

Referring now to FIGS. 7 and 8, yet another preferred embodiment of the present invention is shown. In this embodiment a third spreader box 64 is added. The third spreader box 64 contains a third flowable gelatin mass 66 that is visually distinct from the first gelatin mass 42 and the second gelatin mass 46.

The third spreader box 64 includes its own feed tube 68 for introducing the third gelatin mass 66 into the third spreader box 64. The third spreader box 64 also includes an opening or plurality of openings 70 through which the third gelatin mass 66 may flow onto the base gelatin ribbon 54.

As shown in FIG. 8, a most preferred embodiment using second and third spreader boxes 44, 64 is to form them as a hollow tube divided down its center by a partition 71. One half of the divided hollow tube forms the second spreader box 44 while the other half of the divided hollow tube forms the third spreader box 64. The openings 56, 70 for the second and third spreader boxes 44, 64 should preferably be in communication only with their respective spreader box. In this way, stripes of various patterns and positions may be produced in two visually distinct colors or appearances on a base gelatin ribbon 54.

As shown in FIG. 7, the third spreader box 64 may extend beyond the second spreader box 44 in the hollow tube or vice versa. Also, the addition of more than three spreader boxes containing more visually distinctive gelatin masses may be achieved in like fashion.

As shown in FIG. 7, the use of a third spreader box 64 permits the formation of multi-colored striping effects on a patterned gelatin ribbon 58. Of course, these effects can be varied by the introduction of a mover 62 and/or a pressurizer 63 as described above.

Figure 9:
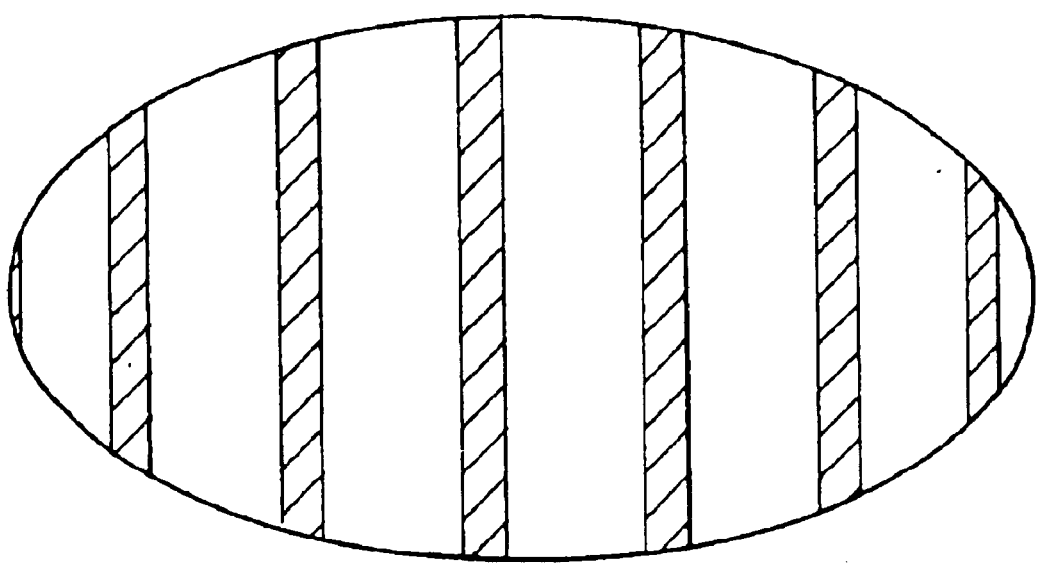
FIG. 9 is a plan view of a preferred embodiment of a soft gelatin capsule formed by the inventive process.
Figure 10:
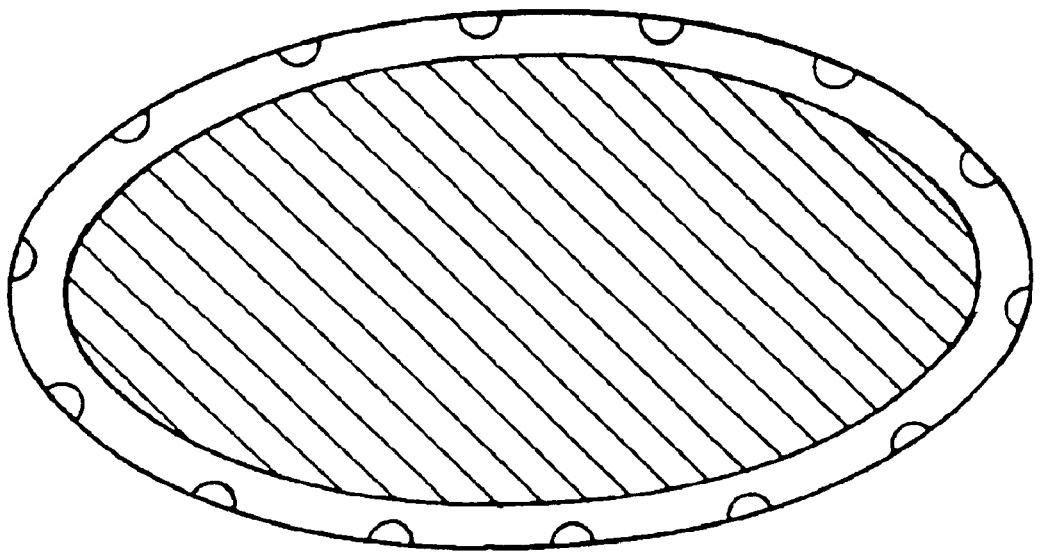
FIG. 10 is a cross-sectional, schematic view of the soft gelatin capsule of FIG. 9.

FIGS. 9 and 10 show an embodiment of a soft gelatin capsule formed with the inventive apparatus and according to the inventive process. In this particular embodiment, the soft gelatin capsule is made from a patterned gelatin ribbon 58 has a plurality of spaced stripes in a single color. Furthermore, the stripes are of a single width. FIG. 9 shows a representative sample of a striping effect that can be achieved using the present invention, while FIG. 10 shows a cross-section through the shell and into the fill material 72 of such a representative capsule.

A marbleizing effect may be achieved using the inventive apparatus and process by rapidly oscillating a second (and/or third spreader box) with respect to a fixed first spreader box. Such a rapid oscillation will cause the second (and/or third) gelatin mass to be deposited somewhat chaotically on the base gelatin ribbon 54, giving the appearance of a marbled or marbleized pattern on the resulting patterned gelatin ribbon 58.

The third spreader box 64 need not be physically connected or integral with the second spreader box 44 as depicted in FIGS. 7 and 8. Instead, it could constitute an independent hollow tube or other conformation that could be independently pressurized and/or moved relative to the first and/or second spreader boxes 40, 44. As with the second spreader box, many shapes, sizes and conformations of a third spreader box 64 may be used in connection with the present invention to advantage.

In practicing the inventive process, the first gelatin mass contained in the first spreader box is flowed through the gap formed by the inner surface of the first spreader box and the outer surface of the second spreader box. In this way, a base gelatin ribbon is formed. The second gelatin mass, which is contained in the second spreader box, is then flowed through an opening in the second spreader box onto a portion of the base gelatin ribbon. Since the second gelatin mass is visually distinct from the first gelatin mass, a patterned gelating ribbon is formed. This patterned gelatin ribbon may then be used to form a patterned soft gelatin capsule by the rotary die process.

A patterned gelatin ribbon formed according to the inventive process may be used with a conventional gelatin ribbon to form a soft gelatin capsule that is half patterned and half plain. Alternatively, two patterned soft gelatin ribbons may be used to form a completely patterned soft gelatin capsule, the patterns on each half either being the same or different. In this way, an almost limitless number of variations in the patterns of soft gelatin capsules may be achieved. In addition, the inventive method is easy to use, convenient, does not require additional elaborate apparatus above and beyond that required for the conventional rotary die process. Furthermore, it is highly reproducible from batch to batch and permits the formation of many new and unique patterns for soft gelatin capsules.

In order to achieve a striped effect, the inventive process is used with a second spreader box having one or more spaced openings that provides stripes on the base gelatin ribbon. The width and relative position of the stripes may be varied and the colors of these stripes may be varied with the use of additional spreader boxes.

A wavy striped effect may be achieved by oscillating or moving the second (or additional) spreader boxes with respect to the first spreader box. A ridged effect may be achieved by pressurizing and/or depressurizing the flow rate of the second (or additional) gelatins onto the base gelatin ribbon. Finally, a marbleized effect may be achieved by rapid oscillation of the second (or additional) spreader boxes with respect to the first (or other) spreader boxes.

In order to avoid premature intermingling of the different visually distinct gelatin masses, the various spreader boxes should preferably be opeatively sealed with respect to each other except for the gaps or openings used to form the base ribbon and patterned ribbon.

We claim:

1. An apparatus for producing a patterned ribbon useful for forming patterned soft capsules comprising a casting drum, a first spreader adapted to hold a first flowable mass and having an opening through which the first mass may flow and a second spreader with at least two openings, said second spreader being adapted to hold a second flowable mass, the second mass being visually distinct from the first mass.

2. The apparatus of claim 1 wherein the second spreader is a hollow tube.

3. The apparatus of claim 2 additionally comprising an oscillator capable of moving the second spreader relative to the first spreader, the first spreader being stationary.

4. The apparatus of claim 1 additionally comprising a pressurizer adapted to increase the flow rate of the second flowable mass through the openings in the second spreader by applying pressure to the second flowable mass.

5. The apparatus of claim 1 additionally comprising a third spreader adapted to hold a third flowable mass, said third mass visually distinct from the first mass and the second mass, the third spreader having an opening through which the third flowable mass may flow.

6. A process for producing a patterned ribbon useful for forming patterned soft capsules comprising:
   a) flowing a first mass contained in a first spreader through an opening; and
   b) flowing a second mass contained in a second spreader into said first spreaded mass, the second mass being visually distinct from the first mass thereby forming the patterned ribbon.

7. The process of claim 6 wherein the second mass is a different color from the first mass.

8. The process of claim 6 wherein the second spreader has a plurality of spaced openings such that stripes are formed.

9. The process of claim 8 wherein the second spreader is osciltated relative to the first spreader to form wavy stripes.

10. The process of claim 6 wherein the flow rate of the second mass is varied.

11. The process of claim 6 wherein the flow rate is varied by pressure applied to the second mass.

12. The process of claim 6 wherein forming a pair of patterned ribbons further comprises:
   flowing a third mass contained in a third spreader through an opening in the third spreader into a spreaded mass, the third mass being visually distinct from the first mass and the second mass thereby forming the patterned ribbon.

13. The process of claim 12 wherein the third mass is a different color from the first mass and the second mass.

14. A process for producing a patterned ribbon useful for forming patterned soft capsules comprising:
   a) flowing a first mass contained in a first metering device through an opening therein toward a casting drum;
   b) flowing a second mass contained in a second metering device through an opening therein toward the casting drum, the second metering device being positioned within the first metering device, the second mass being visually distinct from the first mass; and
   c) forming a ribbon from the first and second masses on the casting drum.

15. A process according to claim 14 wherein the second mass flows from the opening in the second metering device prior to formation of the ribbon.

16. A process according to claim 14 wherein the second mass flows from the second metering device through a plurality of openings in the second metering device.

* * * * *

UNITED STATES PATENT AND TRADEMARK OFFICE
CERTIFICATE OF CORRECTION

PATENT NO. : 6,805,818 B2
DATED : October 19, 2004
INVENTOR(S) : Gregory A. Schurig et al.

It is certified that error appears in the above-identified patent and that said Letters Patent is hereby corrected as shown below:

Column 1,
Line 47, replace "invented the rotary-die" with -- invented the rotary die --.

Column 4,
Line 56, replace "this will mean that the two type of" with -- this will mean that the two types of --.

Column 8,
Line 25, replace "The process of claim 6 wherein the flow rate is varied" with -- The process of claim 10 wherein the flow rate is varied --.

Signed and Sealed this

Twenty-second Day of February, 2005

JON W. DUDAS
*Director of the United States Patent and Trademark Office*